United States Patent [19]
Collins

[11] Patent Number: 5,926,931
[45] Date of Patent: Jul. 27, 1999

[54] RETENTION KNOB EXTRACTION TOOL

[76] Inventor: Daryl G. Collins, 11614 Pennsylvania Ave., Hollydale, Calif. 90280

[21] Appl. No.: 08/869,785

[22] Filed: Jun. 5, 1997

[51] Int. Cl.[6] .................................................. B23P 19/04
[52] U.S. Cl. .............................................. 29/240; 81/124.3
[58] Field of Search ...................... 29/240, 282; 269/287; 81/124.3, 124.7, 121.1

[56] References Cited

FOREIGN PATENT DOCUMENTS

| | | | |
|---|---|---|---|
| 469584 | 5/1975 | U.S.S.R. | 81/124.7 |
| 995 | 5/1903 | United Kingdom | 81/124.7 |

OTHER PUBLICATIONS

Pp. 528, 529 and 532 from the 1997 Industrial Supply Buyer's Catalog.
Pp. 1307, 1308, 1309, 1310, 1314 and 1317 from the J&L Catalog.
Pp. 528, 529, 530 and 532 from the Rutland Buyers supply Catalog.

*Primary Examiner*—Timothy V. Eley
*Assistant Examiner*—Benjamin M. Halpern
*Attorney, Agent, or Firm*—Arthur E. Oaks

[57] ABSTRACT

A device adapted to insert or remove a retention knob from a machine tool assembly used in computer controlled machine tools without compromising the use of the retention knob in other tool assemblies.

15 Claims, 2 Drawing Sheets

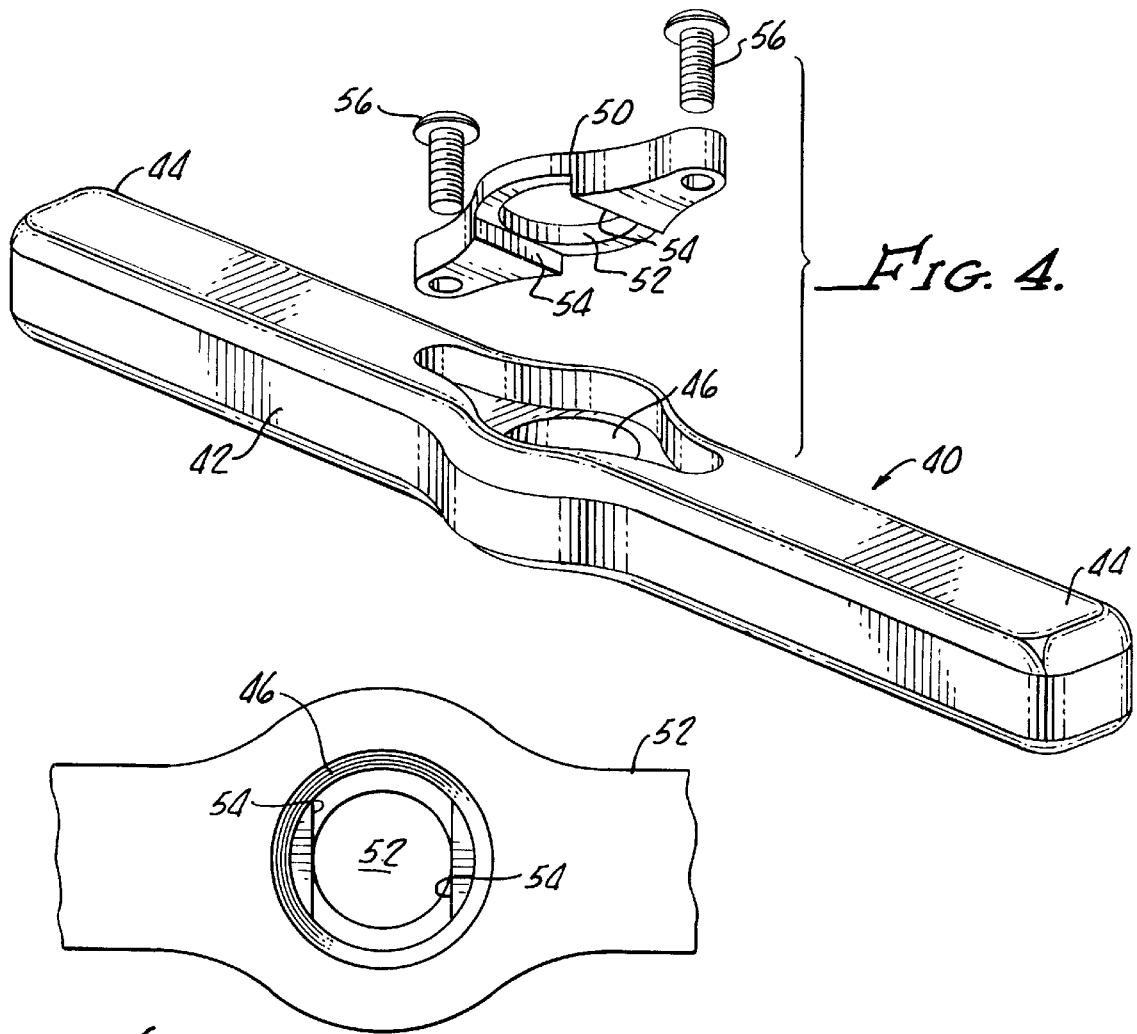
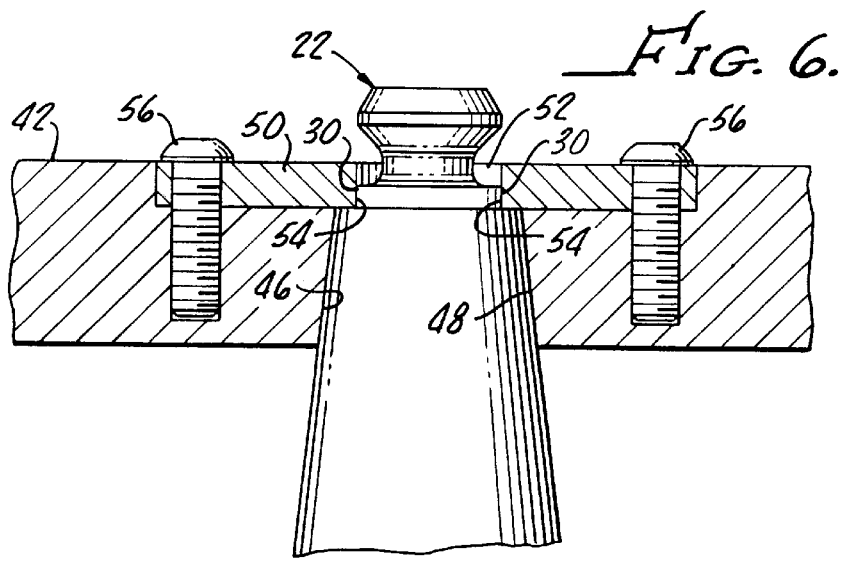

RETENTION KNOB EXTRACTION TOOL

BACKGROUND OF THE INVENTION

1. Field of the Invention

The present invention generally relates to the field of tooling assemblies used in automatic or computer controlled machine tools and more particularly to devices for inserting and removing retention knobs from said tooling assemblies.

2. Description of the Prior Art

Automatic or computer controlled machine tools are characterized by having a multiplicity of individual tool holding assemblies which can be individually accessed and used for particular drilling, cutting, turning or threading operations. Typically, these assemblies comprise a keyless chuck having a vertical hollow shaft running its entire length. At the bottom end or base it is adapted to receive and fixedly hold a working tool in proper orientation to perform a particular metal-working function. The opposite distal end of the shaft is threaded and adapted to receive and threadably hold a retention or "pull stud" knob. Normal practice is to store a number of these tool assemblies in a tool rack, with the end of the chuck holding the working tool bit oriented downwardly and the retention knob oriented upwardly. Whenever a particular tool assembly is needed, a control signal generated by the computer causes a gripper to be dispatched to its location within the tool rack, then to firmly grasp the tool and then finally to remove the tool from the rack for subsequent use in the machine. At the conclusion of the machining operation, the above movement is reversed so that the working tool assembly is removed from the working area and returned to it's tool rack position for storage until needed again.

While a small machine shop may have only one computer controlled machine, most larger captive in-house and outside commercial shops will have several. Further, these several units, which are usually made by different manufacturers, may differ significantly in age, overall function and in the design and capacity of the ancillary equipment, such as the tool rack and the tool assembly gripper. Because the tool racks associated with each of these units are usually limited in the number of tools they can hold, it may be necessary to move one or more particular tool assemblies from one machine to another to accomplish a particular task. Although the cutting tools and the keyless chucks holding them are more-or-less standard and universal in use, the designs associated with different machines, while similar in function, usually differ somewhat in form. These machines usually require a particular retention knob style so that the tool assembly may be properly moved into the correct position within the machine. Consequently, tooling assemblies set up for use in one manufacturer's machine tools may not properly fit into another manufacturer's equipment unless the retention knob is removed and replaced with one specifically adapted to work with that machine.

Retention knobs for each different machine design are similar in function, but they are usually found to differ in form in that some are relatively short while others are much longer. To facilitate their removal and reinstallation, most retention knobs typically have a narrow pair of diametrically opposed flat lands so that one can use a wrench or similar tool to grip these lands so that the knob can be rotated either for removal from the chuck or for installation therein. Since these opposed lands are relatively small, a normally sized wrench may be used only with some difficulty when one desires to first grasp these lands and then hold the knob while it is being inserted into or removed from the chuck body, without experiencing some amount of slippage and subsequent damage to the lands. Also, retention knobs are sometimes placed into the chuck body by an assembly machine and when this is done, they are usually tightly bound therein. Most often they are manually installed and usually over-tightened to be sure that they are firmly seated. Regardless of the method used to install these knobs, this tight fit, when combined with the normal stresses introduced during the machining operation, and the small amount of corrosion which may be experienced in normal operation means that loosening and then unscrewing them often requires a fairly intensive initial turning force. Consequently, the use of a standard box or adjustable end wrench may place uneven stresses on the knob body, particularly the gripping points and the threads holding the knob in place within the chuck body. After a while, the cumulative damage caused by using a wrench will degrade the retention knob to the point where it cannot be used further and must be discarded. Since retention knobs are typically made of hardened steel and are, therefore, relatively expensive, it is obvious that a less damaging means for changing them would result in a significant cost saving for the average machine shop.

SUMMARY OF THE INVENTION

It is the general object of the present invention to provide improved means for grasping of the lands of retention knobs used in tooling assemblies so that said knobs can be safely inserted into or loosened and then rotated for removal from said chuck body in a damage free condition. This objective is achieved by providing a tool having a central hole conformed to snugly surround the body of the retention knob while firmly contacting the knob landings. After such contact is made, the whole knob/tool assembly can then be rotated as a unit until the knob is either freed from the chuck body or tightly inserted thereinto.

An important feature of the present invention is the provision of replaceable inserts so that it can be used with retention knobs of different shapes and sizes. A second feature is that the insert is typically made of hardened steel so that it will resist deformation over long periods of use. Still a third feature of the present invention is in the design of the insert holder which is configured to closely fit over the knob and the top portion of the chuck body so that an even turning force on the knob body will cause the knob to rotate evenly without introducing any damaging stresses into the threads.

The present invention comprises certain novel features in combination with other structural parts, hereinafter fully described, illustrated in the accompanying drawings, and particularly pointed out in the appended claims, it being understood that various changes may be made in the details without departing from the spirit of the invention, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following detailed description, the invention, its construction and operation, and many of its advantages should be readily observed and appreciated. It should be understood that the invention is not limited to precise arrangements and instrumentalities shown.

FIG. 4 is an exploded perspective view of the retention knob removal tool of the present invention.

FIG. 5 is a bottom view of the centermost portion of the tool of FIG. 4.

FIG. 6 is a cross sectional side view showing the application of the retention knob removal tool of FIG. 4 to the prior art tool assembly of FIG. 1.

DETAILED DESCRIPTION OF THE INVENTION

Figure 1:
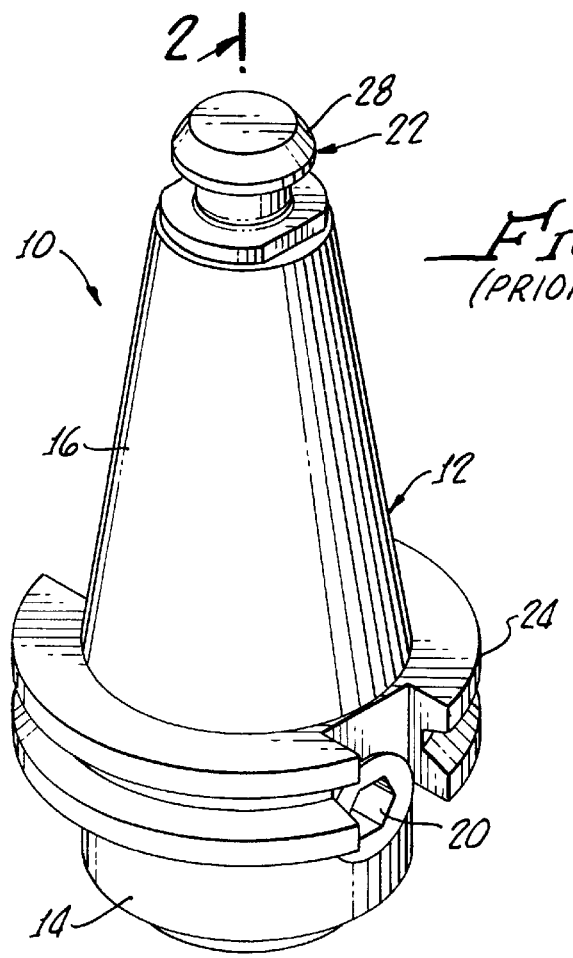
FIG. 1 is an isometric depiction of a prior art typical tool assembly as used in a computer controlled machine.
Figure 2:
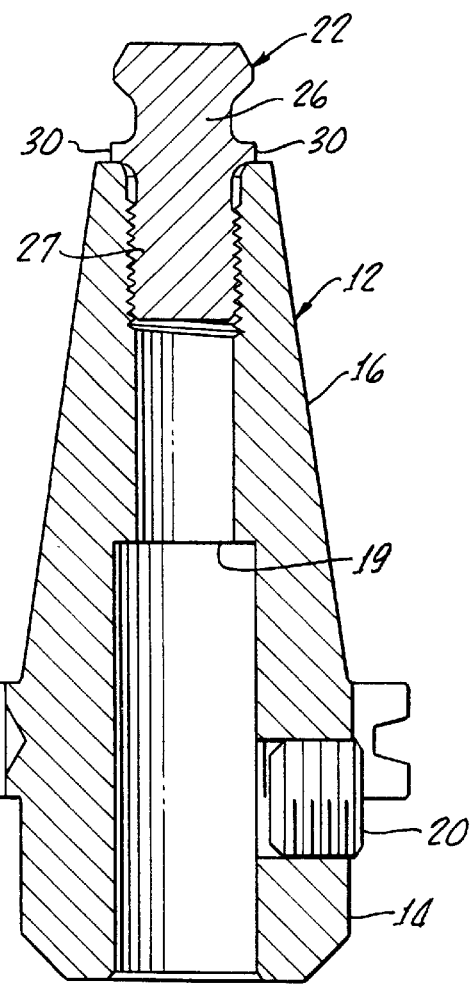
FIG. 2 is a cross sectional view of the prior art assembly of FIG. 1 along the line 2—2.

Referring now to FIGS. 1 and 2, there is illustrated a typical prior art tool assembly 10. As shown, it comprises a chuck body 12, said chuck body typically comprising a lower, more-or-less cylindrical section 14, which will be referred to as the lower end or base section and an upper more-or-less conical section 16, which shall be referred to as the upper end or distal section. Running the entire length of chuck body 12 is a hollow opening, into which a cutting tool, (not shown) may be inserted, at the lower end. Chuck body 12 may be keyed and adjustable so that it can clamp onto tools of different diameters, as is the case with chucks used to hold small drills. More usually, they are keyless and used with tools having a shaft with a fixed, constant diameter. In these assemblies, the tool shaft, which usually has a flattened portion, is inserted into the base section opening of the hollow opening up to an internal shoulder 19, which acts as a positive stop for said tool within the interior of chuck body 12. The tool is then locked into its working position by tightening set screw 20, which is located in the side of base section 14, against the flattened portion of the inserted tool shaft.

The portion of the hollow opening near its uppermost or outermost end within conical section 16 is threaded so as to receive and hold tightly a retention knob 22 when it is inserted thereinto. The chuck body 12 illustrated also has a protective collar 24 running around the cylindrical base section 14, which serves both to protect set screw 20 and to properly position the tool assembly 10 within the machine wherein it is to be used.

Keyless chuck 12 is a more-or-less universal tooling accessory which can be used with a wide variety of drilling, boring, cutting, threading and other metal removal tools. In modern commercial use, several different sizes of keyless chuck 12 may be used. These are almost always made of carbon steel and primarily differ from one another in diameter. Commercially, the smallest, mid-size and the largest diameters are identified as Schedule 30, 40 or 50 chucks respectively. In all of these, the angle of the conical upper portion 14 is typically about 16 degrees, although any angle from about 10 to about 20 degrees could be used.

Typically, tool assemblies are stored at a particular position within a tool rack associated with the machine tool with which the tool assembly 10 is to be used and moved out of and subsequently moved back into the tool rack by a machine controlled gripper mechanism. None of these external features are illustrated.

Shown inserted and threaded into the uppermost, threaded portion of the hollow opening is a typical example of a retention knob 22, which is usually made from hardened tool steel. As shown, it is about 2 inches long and comprises a roughly cylindrical body, 26, said body having a diameter just slightly smaller than that of the chuck opening into which it is to be inserted, said body further having an approximately one inch long threaded portion 27 at its lower end which, when said threaded end is inserted into the distal end of the hollow opening, will engage the threaded portion of opening 18, be easily screwed thereinto, and held tightly in place. When this is done, retention knob 22 becomes an integral part of tool assembly 10.

At the upper or outermost end of knob body 26 is a cylindrical or roughly spherical appendage 28. It is this appendage onto which the gripper of the machine tool closes to firmly grasp appendage 28, so that it can then remove the entire tool assembly 10 from it's associated tool rack position and move it into the working machine.

Figure 3:
FIG. 3 is an enlarged top view of a typical retention knob of the prior art.

Near the base of knob body 26 are a pair of diametrically opposed flat lands 30, shown most clearly in FIG. 3. These lands 30 serve as gripping points for an extraction tool, when it is desired to insert or remove retention knob 22 and replace it with one of a different size or shape. Typically, the machine operator will use an adjustable end wrench or a box wrench (not shown) to loosen the knob so that it can then removed and changed. Also typically, flat lands 30 are relatively narrow, so that said wrench will usually make close contact with lands 30 only with some difficulty. More usually, there is a certain amount of slippage which occurs when the wrench is used either to tighten knob 22 after installation, or to loosen it for removal from chuck body 12. This slippage tends to cause the jaws of the wrench to slip over and around lands 30, so that, in time, lands 30 are degraded to some degree. The use of a wrench also acts to cause uneven and sometimes damaging stresses on the threads as knob body 26 is first loosened and then turned for removal. Even though knob body 26 is usually made from hardened tool steel, the damages caused by these conditions are cumulative and, therefore, will eventually reach a point where it can no longer be used.

It should be understood that even a cursary examination of an average tool distributor's catalog will show that chuck and, particularly, retention knob designs are not standard and that a wide variety of chucks and knobs of many different sizes and shapes are available. However, the particular combination of chuck and knob designs used is not critical to the operation of the present invention as long as the chuck body and knob have the basic features described herein above.

The retention knob extraction tool 40 of the present invention acts to prevent land damage and thus to preserve the utility of these retention knobs for much longer periods of time. As shown in the preferred embodiment illustrated in FIGS. 4–6, extraction is tool 40 comprises a bilaterally symmetrical extraction tool body 42, said body having a pair of ends 44 and a central opening 46 therein. As will be explained in further detail herein below, while bilateral symmetry is preferred, it is possible for alternative designs to function almost as well.

To facilitate a close fit over the assembled tool body, the sides 48 of central opening 46 are tapered so that the tool body 42 will easily fit down and over the conical sides of chuck body 12 to place extraction tool 40 in the proper position. Since chuck bodies 12 come in different diameters, it is understood that different sized tool bodies 42 may need to be used to accommodate normally used Schedule 30, 40 or 50 chuck bodies, even if the retention knob used for all three types is the same. To accomplish a close fit when in use, the taper within the central opening is configured to fit closely over and then onto conical chuck bodies having a cone angle anywhere from 10 to 20 degrees, preferably from 12 to 18 degrees and most preferably from 14 to 17 degrees. The most usual conical taper is 16 degrees. The material used for tool body 42 is not critical. Metals, such as aluminum, brass, and carbon or even stainless steel all can be used, as can some engineering plastics such as reinforced Delrin or Lexan. However, for most applications, aluminum is preferred.

Set within central opening 46 is insert 50. This is configured to allow the central opening 46 of tool 40 to fit over top of and then to drop down over the particular retention knob 22 in use, so that when the extraction tool 40 is in proper position, as shown in FIG. 6, it will make firm and complete contact with the sides of lands 30 of retention knob 22. This is accomplished through the internal configuration of insert 50. As shown most clearly in FIG. 6, close contact with lands 30 is achieved by a pair diametrically opposed flat sections 54, which are located at the base of insert 50 and which are positioned to just fit around lands 30. Typically, insert 50 is held in place with a pair of machine screws 56, so that it can easily be removed and replaced, should the need arise. As noted above, the same retention knob design is available for use with Schedule 30, 40 and 50 chuck bodies, so the same basic insert design can be used with all three sizes. The basic difference will be in the diameters of the central openings of the the tool body and insert. Also, where most, if not all of said tool assemblies 10 have the same schedule size for the chuck body 12, it is possible for the contour of central opening to be adapted to both fit over the sides of chuck body 12 and also around lands 30, without the necessity of having to use a removable insert.

After extraction tool 40 is properly positioned, merely applying a counterclockwise force to the ends 44 of symmetrical body 42 will cause retention knob 22 to smoothly loosen and then rotate out of chuck body 12. Similarly, a clockwise force to an unmounted retention knob will cause said knob to be rotated into and property seated within chuck body upper portion 16 with a minimum of difficulty. Typically, insert 50 is made from a tool steel similar to that used for making the retention knobs 22. While this serves to minimize wear and tear on the insert and is therefore preferred, such a material is not critical to the operation of extraction tool 40.

It will be appreciated that the above described bilaterally symmetrical embodiment of the present invention, while preferred, is not the only embodiment thereof which can be used. Since only that portion of extraction tool body 42 containing the contoured central opening 46, as described herein above is really critical to the use of the present invention, the bilateral symmetry described herein above need not be present. Rather, a tool comprising this central portion of the tool could be configured to fit onto the socket holder of a conventional ratcheting socket wrench and used therewith. Such an embodiment would improve the portability and overall utility of the present invention when clearances are limited and is, therefore, considered to be within the ambit of the present invention. Further, the action of such a tool, since it fits vertically onto the retention knob and conical chuck body portion, would not introduce uneven radial forces, as is the case when tools such as adjustable end wrenches or box wrenches are used.

Thus there has been described a new and improved tool for removing retention knobs from tool assemblies adapted for use with computer controlled machine tools. It is to be understood that the above-described embodiment is merely illustrative of the many specific embodiments which represent applications and uses of the present invention. Clearly, numerous other arrangements can be readily devised by those of skill in the art without departing from the spirit and scope of the invention as defined in the appended claims and all changes which come within the scope and equivalency of these claims are intended to be embraced therein.

What is claimed is:

1. An extraction tool for inserting or removing retention knobs from tooling assemblies used in automatic or computer controlled machine tools, said tooling assemblies comprising a cutting tool, a chuck body having a cylindrical lower end adapted to receive said cutting tool and means to hold said cutting tool in a proper position for use and a conical upper end having an internal opening adapted to receive and threadably hold a retention knob for use when said machine tool requires removing said tool assembly from a tool rack and moving it to the working area of said machine tool or returning it from said machine tool to said tool rack, said retention knob further comprising a pair of diametrically opposed flat lands, said lands providing a gripping point whenever said retention knob must be screwed into and tightened for installation within said chuck body, or loosened and unscrewed for removal from said chuck body; said extraction tool further comprising a body, with said body having at least one force applying arm attached thereto, said body further having an opening contoured on its inner surface to fit snugly around said chuck body said chuck body having a replaceable insert having an internal contour adapted to fit over said retention knob when said replaceable land fitting means is placed in close contact with said flat lands, so that a clockwise force applied to said force applying arm will cause said extraction tool to rotate so as to tighten said retention knob within said chuck body and a counterclockwise force applied to said extraction tool will cause the retention knob to be easily removed from said chuck body in a damage-free condition.

2. The extraction tool of claim 1 wherein said tool body is bilaterally symmetrical with said body having a pair of diametrically opposed arms and with said opening or closing force being applied to the ends of said arms.

3. The extraction tool of claim 1 wherein the central opening is adapted to fit onto a chuck body having a conical angle of between about 10 and about 20 degrees.

4. The extraction tool of claim 3 wherein said central opening is adapted to fit onto a chuck body having a conical angle of between about 14 and about 17 degrees.

5. The extraction tool of claim 1 wherein said replaceable land fitting means is made of tool steel.

6. The extraction tool of claim 1 wherein said tool body is made from the group consisting of metals and reinforced engineering plastics.

7. The extraction tool of claim 6 where said group of metals consists of aluminum, brass and carbon steel and stainless steel.

8. The extraction tool of claim 6 where said group of reinforced engineering plastics consists of Delrin and Lexan.

9. The device of claim 6 wherein said device body is made from aluminum.

10. An extraction tool for removing retention knobs from tooling assemblies used in automatic or computer controlled machine tools, said tooling assemblies comprising a cutting tool, a chuck body having a cylindrical lower end adapted to receive said cutting tool and with means to hold it in a proper position for use, and a conical upper end having a conical angle of between about 14 and 17 degrees, said conical end being further adapted to receive and firmly retain a retention knob for use when said machine tool requires removing said tool assembly from a tool rack and moving it to the working area of the machine tool and returning it to said tool rack, said knob further comprising a pair of diametrically opposed flat lands, said lands providing a gripping point whenever said retention knob must be loosened and unscrewed for removal from said chuck body, said extraction tool comprising a bilaterally symmetrical body, said body having a pair of diametrically opposed ends and a central opening, said opening being contoured on its inner surface to fit over said retention knob and to fit snugly around said chuck body, and further containing a removable insert fitted into said central opening and having an internal contour adapted to fit over said retention knob and closely around said flat lands, so that a clockwise force will safely tighten said retention knob within said chuck body and a counter clockwise force applied to said opposed body ends will cause the retention knob to be easily removed from said chuck body in a damage-free condition.

11. The insert of claim 10 wherein said insert is made of tool steel.

12. The extraction tool of claim 10 wherein said tool body is made from the group consisting of metals and reinforced engineering plastics.

13. The extraction tool of claim 12 where said group of metals consists of aluminum, brass and carbon steel and stainless steel.

14. The extraction tool of claim 12 where said group of reinforced engineering plastics consists of Delrin and Lexan.

15. The device of claim 13 wherein said device body is made from aluminum.

* * * * *